United States Patent
Andreoletti et al.

(10) Patent No.: US 8,208,476 B2
(45) Date of Patent: Jun. 26, 2012

(54) METHOD OF ROUTING VIRTUAL LINKS IN A FRAME-SWITCHING NETWORK

(75) Inventors: Remi Andreoletti, Toulouse (FR); Frederic Minot, Venerque (FR); Remi Cabaret, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 262 days.

(21) Appl. No.: 12/303,423

(22) PCT Filed: May 24, 2007

(86) PCT No.: PCT/FR2007/051323
§ 371 (c)(1),
(2), (4) Date: Dec. 4, 2008

(87) PCT Pub. No.: WO2007/144527
PCT Pub. Date: Dec. 21, 2007

(65) Prior Publication Data
US 2009/0180482 A1    Jul. 16, 2009

(30) Foreign Application Priority Data

Jun. 12, 2006 (FR) .................................. 06 52093
Jan. 30, 2007 (FR) .................................. 07 52972

(51) Int. Cl.
*H04L 12/28* (2006.01)
*H04L 12/56* (2006.01)
(52) U.S. Cl. ........................................ 370/397; 370/351
(58) Field of Classification Search .................. None
See application file for complete search history.

(56) References Cited

U.S. PATENT DOCUMENTS

| | | | | |
|---|---|---|---|---|
| 5,682,301 A | * | 10/1997 | Kraft | 361/826 |
| 5,754,543 A | * | 5/1998 | Seid | 370/351 |
| 5,812,525 A | * | 9/1998 | Teraslinna | 370/229 |
| 6,041,057 A | * | 3/2000 | Stone | 370/397 |
| 6,088,333 A | * | 7/2000 | Yang et al. | 370/238 |
| 6,167,051 A | * | 12/2000 | Nagami et al. | 370/397 |
| 6,175,870 B1 | * | 1/2001 | Gawlick et al. | 709/227 |
| 6,201,810 B1 | * | 3/2001 | Masuda et al. | 370/395.32 |

(Continued)

OTHER PUBLICATIONS

U.S. Appl. No. 12/303,783, filed Dec. 8, 2008, Andreoletti, et al.

(Continued)

*Primary Examiner* — Phirin Sam
*Assistant Examiner* — Peter Chau
(74) *Attorney, Agent, or Firm* — Oblon, Spivak, McClelland, Maier & Neustadt, L.L.P.

(57) ABSTRACT

A process for routing virtual links in a frame-switching network including a plurality of source and/or destination terminals of the frames, in which frame switches are connected to one another by physical connections, with each virtual link being defined, for a point-to-point type, by a path through the network between a source terminal and a destination terminal, and, for a multipoint type, by a plurality of paths through the network between a source terminal and a plurality of destination terminals. The process performs the routing of links by minimizing at least one cost function on a set of solutions satisfying at least one predetermined topological constraint.

26 Claims, 10 Drawing Sheets

U.S. PATENT DOCUMENTS

| | | |
|---|---|---|
| 6,363,319 B1 * | 3/2002 | Hsu .................. 701/202 |
| 6,584,093 B1 | 6/2003 | Salama et al. |
| 6,707,820 B1 * | 3/2004 | Arndt et al. ............ 370/395.2 |
| 2003/0028670 A1 * | 2/2003 | Lee et al. .............. 709/241 |
| 2003/0179716 A1 * | 9/2003 | Liu .................... 370/254 |
| 2003/0198213 A1 * | 10/2003 | Jensen et al. .......... 370/351 |
| 2005/0013292 A1 * | 1/2005 | Johnson et al. ........ 370/352 |
| 2005/0083936 A1 | 4/2005 | Ma |
| 2006/0083251 A1 | 4/2006 | Kataoka et al. |
| 2007/0058607 A1 * | 3/2007 | Mack-Crane et al. ...... 370/351 |

OTHER PUBLICATIONS

Dharanikota, et al. "Inter-domain routing with Shared Risk Groups", IETF Standard-Working-Draft, Internet Engineering Task Force, pp. 1-18, 2001.

AFDX protocol tutorial, Condor Engineering, "Leading the World in Avionics Interface Solutins" pp. i-iv, and 1-47, 2005.

J.Y. Le Boudec, "Application of Network Calculus to Guaranteed Service Networks",IEEE Transactions on Information Theory, vol. 44, No. 3, pp. 1087-1096, 1998.

\* cited by examiner

METHOD OF ROUTING VIRTUAL LINKS IN A FRAME-SWITCHING NETWORK

TECHNICAL FIELD

This invention relates to the field of routing in a frame-switching network and more specifically an AFDX network.

PRIOR ART

The Ethernet networks are the best known among local networks. They can function under two modes that are distinct but compatible with one another: a so-called shared mode, in which a single physical medium is shared between the terminals, with random access and detection of frame collisions, and a so-called switched mode, in which the terminals exchange frames by means of virtual connections, thus guaranteeing the absence of collisions.

In a switched Ethernet network, each terminal, source or destination, is connected individually to a frame switch, and the switches are connected to one another by physical connections. More specifically, each switch has a plurality of ports connected to the ports of other switches or terminal couplers. A virtual connection between a source terminal and a destination terminal is defined as a path through the network followed by the frames from the source terminal intended for the destination terminal. Similarly, a virtual connection is defined by the list of switches through which these frames pass. For each switch traversed, the frame switching is performed on the basis of the destination address, by means of a pre-established switching table. This switching table is very simple since it indicates, on the basis of the switch input port and the frame destination address, the corresponding output port.

Another well known example of a frame switching network is the ATM network in which a virtual circuit connection (VCC) can be established in order to route basic frames or cells between a source and destination terminal.

We will use the term "virtual link" to refer to a level-2 end-to-end connection in a frame switching network, such as a virtual connection in a switched Ethernet network or a virtual circuit connection in an ATM network. In a frame-switching network, the virtual links are routed through the network, either administratively or by signaling with the control plan. The routing of links consists of defining and programming the switching tables of the various switches of the network. In general, these switching tables can be static (administrative routing) or dynamic (routing by signaling).

In some cases, it is possible to obtain a certain guarantee of service by virtual link. For example, in an ATM network, the CBR (Constant Bit Rate) service class enables a constant bandwidth and a minimum flow rate to be reserved on the link. However, as the switches can support only a given maximum flow rate, this service guarantee imposes constraints on the routing of links.

Similarly, the AFDX (Avionics Full Duplex Switched Ethernet) network, developed for aeronautical needs, is a switched Ethernet network in which it is possible to reserve a bandwidth by virtual link. More specifically, each virtual link is associated with a minimum interval between frames as well as a maximum frame size. Moreover, a maximum time of routing frames or a latency time is guaranteed for each virtual link. Given that the switches can ensure only a given flow rate per output port, the guarantee of virtual link characteristics is again subject to routing constraints.

This invention applies preferably but not exclusively to AFDX networks. A detailed description of this network can be found in the document entitled "AFDX protocol tutorial", available at the website www.condoreng.com as well as in the patent application FR-A-2832011 filed in the applicant's name. Its main characteristics will simply be summarized below.

As mentioned above, the AFDX network is based on a switched Ethernet network. It is also a full-duplex network, in which each terminal can simultaneously transmit and receive frames on distinct virtual links. The AFDX network is also deterministic, in the sense that the virtual links have guaranteed characteristics in terms of latency time, physical segregation of streams, bandwidth and flow rate. Each virtual link thus has a path reserved from end-to-end, of a time fragmentation into transmission intervals (called BAG for Bandwidth Allocation Gap) and with a maximum frame size. The frames are sent at the start of each transmission interval with a predetermined jitter tolerance. Finally, the AFDX network is redundant, in the sense that it is duplicated for reasons of availability.

The data is transmitted in the form of IP packets encapsulated in Ethernet frames. By contrast with the classic Ethernet switching (using the destination Ethernet address), the frame switching on an AFDX network uses a virtual link identifier concatenated to the frame header. When a switch receives a frame at one of its input ports, it reads the virtual link identifier and determines, on the basis of its switching table, the output port(s) from which it should be transmitted. The switches verify, during flight, the integrity of the frames transmitted, but do not request retransmission if a frame is incorrect: the frames detected as incorrect are removed. The frames carried on a virtual link are numbered in sequence. On reception, the destination terminal verifies the integrity of the frame sequence.

Each virtual link is one-way. It can be from only one source terminal at a time, but can arrive at a plurality of destinations. Virtual links in point-to-point mode, which serve only a single destination, are distinguished from virtual links in multipoint mode, which serve a plurality of destinations.

FIG. 1 diagrammatically shows an AFDX network including terminals LRU1 to LRU5 and frame switches SW1, SW2. It can be seen that the virtual link $VL_3$ connecting terminal LRU3 to LRU2 is of the point-to-point type while the virtual links $VL_2$ serving LRU2 and LRU3, and $VL_1$ serving LRU3 to LRU5 are of the multipoint type.

Some virtual links are strongly dependent on one another because they are involved in performing the same function. For example, the virtual links from different navigation sensors of an aircraft participate in the same positioning function. Below, we will use the term "functional bundle" or simply "bundle" to refer to any set of virtual links, of the point-to-point or multipoint type, participating in the same function.

The frame-switching networks offering a service guarantee, such as ATM and AFDX networks, require routing constraints on the virtual links to be imposed. Moreover, on-board applications, in particular aeronautical applications, require additional precautions in turn usually resulting in routing constraints.

Until now, the routing of links in an AFDX network has been performed empirically. This type of routing can be acceptable for a relatively small number of virtual links. With the increase in complexity of aeronautical systems, the number of virtual links can now reach several thousand. This invention is intended to provide a systematic and automatic routing process that takes into account all of the routing constraints and enables the safety of use of the network to be optimized.

DESCRIPTION OF THE INVENTION

This invention is defined by a process for routing virtual links in a frame-switching network including a plurality of frame source and/or destination terminals connected to one another by physical connections, in which each virtual link is defined, for a point-to-point type, by a path through said network between a source terminal and a destination terminal, and, for a multipoint type, by a plurality of paths through said network between a source terminal and a plurality of destination terminals. Said process includes the following steps for at least one virtual link:

(a) selection, from a set of possible paths between the source terminal and the destination terminal(s), of a subset of paths satisfying at least one predetermined topological constraint;

(b) determination, among said subset, of a path for a point-to-point virtual link, or of a plurality of paths for a multipoint virtual link, minimizing at least one given cost function;

(c) routing said virtual link according to the path(s) thus determined.

According to a first alternative, when said virtual link is a point-to-point link and the network is partitioned into distinct zones, said topological constraint is advantageously expressed as a constraint prohibiting crossing between zones if the switches connected respectively to the source terminal and the destination terminal belong to the same zone, and, in the opposite case, as a constraint allowing a single crossing between zones belonging respectively to said source and destination terminals is applied. The selection step can take into account additional topological constraints of segregation and/or collocation of paths possible with respect to virtual links already routed or to be routed simultaneously with said link or switches of said network. Alternatively, or cumulatively, the selection step can take into account additional topological constraints, in which each additional topological constraint concerns a group of paths forming a set of virtual links to be routed simultaneously, in which said group is made up of a plurality $N_{sg}$ of sub-groups of said paths, and said additional constraints express that, at most, a number $n_{sg}$ of sub-groups such that $0 \leq n_{sg} < N_{sg}$ can be invalidated, with a sub-group being invalidated if all of the paths belonging to it are affected by the failure of the same switch of said network.

Said aforementioned cost function can be chosen to be equal to the number of switches traversed by a path.

According to a second alternative, when said virtual link is of a multipoint type and the network is partitioned into distinct zones, a constraint prohibiting crossing between zones is advantageously applied to each possible path between said source terminal and a destination terminal of said link, if the switches connected respectively to the source terminal and to said destination terminal belong to the same zone, and, in the opposite case, a constraint allowing a single crossing between the zones belonging respectively to said source and destination terminals is applied. As mentioned above, it is possible to apply, for each of the possible paths between said source and destination terminal of said link, additional topological constraints of segregation and/or collocation of these paths with respect to virtual links already routed or to be routed simultaneously with said link or switches. Alternatively, or cumulatively, the selection step can take into account additional topological constraints, in which each additional topological constraint concerns a group of paths forming a set of virtual links to be routed simultaneously, in which said group is made up of a plurality $N_{sg}$ of sub-groups of said paths, and said additional constraint expresses that, at most, a number $n_{sg}$ of sub-groups such that $0 \leq n_{sg} < N_{sg}$ can be invalidated, with a sub-group being invalidated if all of the paths belonging to it are affected by the failure of the same switch of said network.

The cost function can be equal to the number of switches traversed by a path and will be minimized on each set of possible paths between said source terminal and a destination terminal of said link, in order to provide at least one candidate path per destination terminal. Advantageously, we combinations of K candidate paths are produced in which K is the number of destination terminals of the link, and each combination corresponds to a possible routing solution of said multipoint link, and a second cost function is minimized on the set of said possible solutions thus obtained. This second cost function evaluates, for each possible solution, the number of switches shared between its various constituent paths.

According to a third alternative, for at least one group of links involved in performing the same function, referred to as a bundle of links, each link being point-to-point and the network being partitioned into distinct zones, a constraint prohibiting crossing between zones is applied, for each of the links of said bundle, to each possible path between the source terminal and the destination terminal of said link, if the switches connected respectively to the source terminal and to the destination terminal belong to the same zone, and, in the opposite case, a constraint allowing a single crossing between the zones belonging respectively to said source and destination terminals is applied. As mentioned above, it is possible to apply, for each virtual link and for each of the possible paths between the source terminal and the destination terminal of said link, additional topological constraints of segregation and/or collocation of these paths with respect to virtual links already routed or to be routed simultaneously with said link or switches. Alternatively, or cumulatively, the selection step can take into account additional topological constraints, in which each additional topological constraint concerns a group of paths forming a set of virtual links to be routed simultaneously, in which said group is made up of a plurality $N_{sg}$ of sub-groups of said paths, and said additional constraints express that, at most, a number $n_{sg}$ of sub-groups such that $0 \leq n_{sg} < N_{sg}$ can be invalidated, with a sub-group being invalidated if all of the paths belonging to it are affected by the failure of the same switch of said network.

Said cost function can be chosen to be equal to the number of switches traversed by a path and will be minimized, for each of the links of said bundle, on each set of possible paths between the source terminal and the destination terminal of said link, in order to provide at least one candidate path per link. Advantageously, combinations of N candidate paths where N is the number of links of said bundle are produced, with each combination corresponding to a possible routing solution of said bundle, and a third cost function is minimized on the set of said possible solutions thus obtained. The third cost function evaluates, for each possible routing solution of the bundle, the number of switches shared between the paths of which said solution is the combination.

According to fourth alternative, for at least one group of links involved in performing the same function, referred to as a bundle of links, with each link being of a multipoint type and the network being partitioned into distinct zones, a constraint prohibiting crossing between zones is applied, for each of the links of said bundle, to each possible path between the source terminal and the destination terminal of said link, if the switches connected respectively to the source terminal and to the destination terminal belong to the same zone, and, in the opposite case, a constraint allowing a single crossing between the zones belonging respectively to said source and destination terminals is applied. As mentioned above, it is possible to apply, for each virtual link and for each of the possible paths between the source terminal and the destination terminal of said link, additional topological constraints of segregation and/or collocation of these paths with respect to virtual links already routed or to be routed simultaneously with said link or switches of said network. Alternatively, or cumulatively, the selection step can take into account additional topological constraints, in which each additional topological constraint concerns a group of paths forming a set of virtual links to be routed simultaneously, in which said group is made up of a plurality $N_{sg}$ of sub-groups of said paths, and said additional constraints express that, at most, a number $n_{sg}$ of sub-groups such that $0 \leq n_{sg} < N_{sg}$ can be invalidated, with a sub-group being invalidated if all of the paths belonging to it are affected by the failure of the same switch of said network.

Said cost function can be chosen to be equal to the number of switches traversed by a path and will be minimized, for each of the links of said bundle, on each set of possible paths between the source terminal and the destination terminal of said link, in order to provide at least one candidate path per link and per destination terminal. Advantageously, combinations of $K_1 + K_2 + \ldots + K_N$ candidate paths where $K_i$, $1 < i \leq N$ are the numbers of respective paths of the N links of said bundle are produced, with each combination corresponding to a possible routing solution of said bundle, and a fourth cost function is minimized on the set of said possible solutions thus obtained. The fourth cost function evaluates, for each possible routing solution of the bundle, the number of switches traversed by the links of the bundle corresponding to this solution.

In all of the alternatives above, said network zones are, for example, supplied by independent power supply sources.

Finally, regardless of the alternative, we will advantageously minimize a fifth cost function evaluating the traffic load of the most heavily loaded switch of the network, on the set of the routing solutions obtained by minimizing one of the second, third or fourth cost functions.

The invention also relates to a computer program including software means suitable for implementing the steps of the process defined above, when it is run on a computer.

DETAILED DESCRIPTION OF SPECIFIC EMBODIMENTS

The basic idea of the invention is to perform the routing of a virtual link by selecting from among the possible paths, those that meet a predetermined topological constraint or a plurality of predetermined topological constraints, then of selecting from among those, the one(s) that minimize a predetermined cost function.

Figure 2:
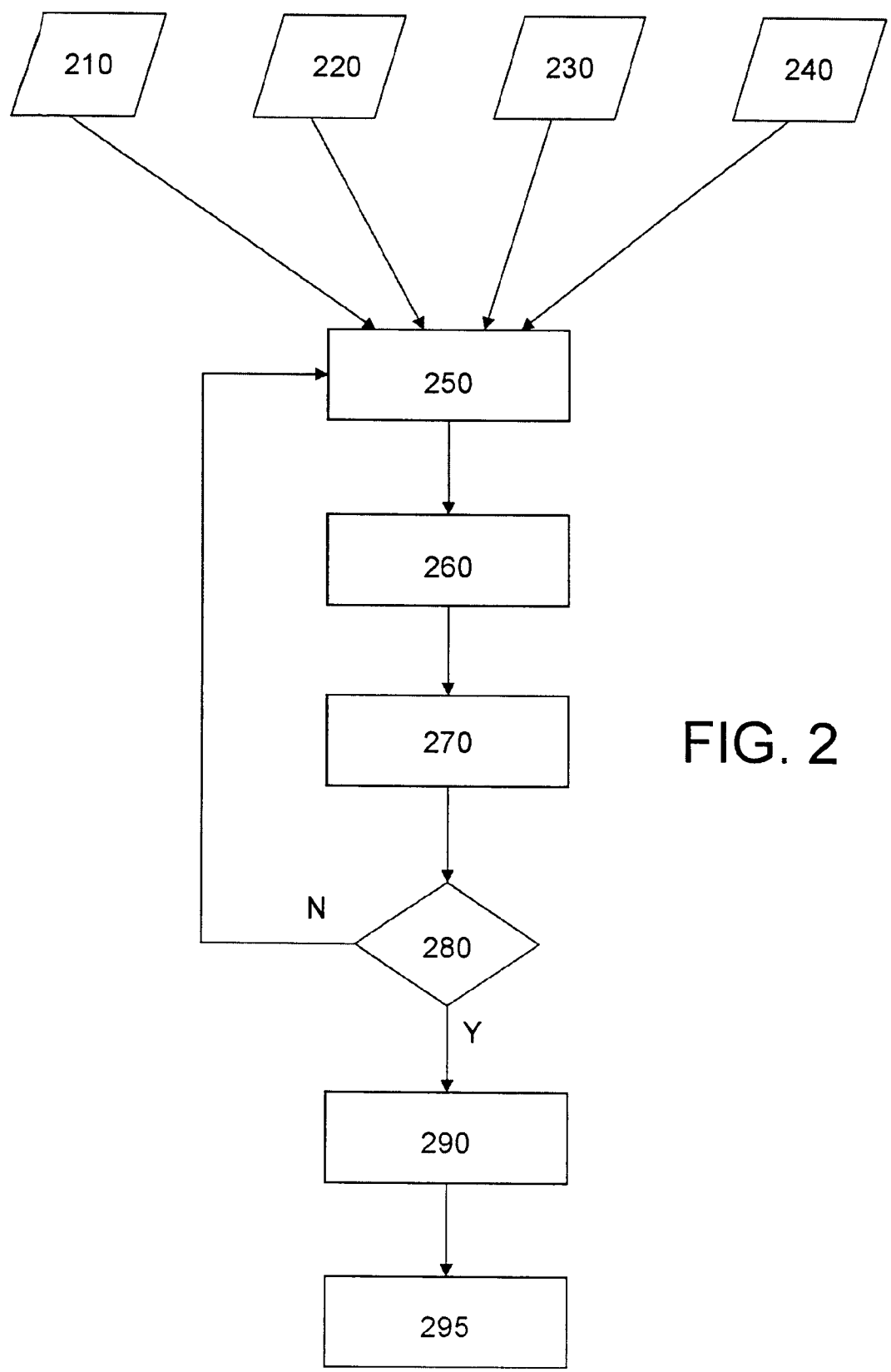
FIG. 2 diagrammatically shows an organizational chart of the virtual link routing method according to an embodiment of the invention.

FIG. 2 shows the principle of the routing process according to the invention.

Said process uses, at the input:
  a file 210 describing the topology of the network, namely the end nodes (terminals), the switching nodes and the physical connections between the nodes;
  a file 220 giving the status of the network, namely the capacities of the ports of the switches, and the virtual links already routed with their characteristics;
  a file 230 giving the characteristics of the virtual link(s) to be routed. Each virtual link is described therein by the identifiers of the switches connected respectively to the source terminal and to the destination terminal (point-to-point mode) or to the destination terminals (multipoint mode), the duration of the transmission interval (BAG) and the maximum length of the frames on the link, the possible belonging to a functional bundle and, as the case may be, the identifier of the bundle;
  a file 240 stating topological constraints, which will be described in detail below.

The algorithm involves, in a first step 250, the selection of paths between the source terminal and the destination terminal that satisfy a constraint or a plurality of topological constraints indicated in 240.

The algorithm involves, in a second step 260, the minimization of a cost function or the minimization of a plurality of cost functions, successively or jointly. For the purposes of joint minimization, as detailed below, a composite cost function is created as a linear combination of the aforementioned cost functions, with the weighting coefficients being chosen so as to reflect the relative importance of the costs in the routing choice. Alternatively, the cost functions are minimized one after another in order of decreasing priority, with each minimization being performed on the subset of solutions provided by the preceding minimization step.

If the minimization of the cost function(s) gives a plurality of equivalent solutions, one solution is chosen arbitrarily from them. The solution at the end of 260 provides the path (point-to-point mode) or the paths (multipoint mode) enabling the virtual link to be routed. In step 270, the status file of the network 220 is updated. The algorithm proceeds iteratively until depletion of the virtual links to be routed.

In 280, it is verified that all of the virtual links are routed, and, if they are, according to an embodiment, a step of verifying the determinism of the network is performed in 290. This step is managed by an algorithm called "network calculus" known from the prior art, for example the article of Jean-Yves Le Boudec entitled "Application of network calculus to guaranteed service networks", published in IEEE Trans. on Information Theory, Vol. 44, no 3, May 1998. This algorithm calculates, on the basis of a traffic envelope at all of the points of the network, the latency terminals and the sizes of the queues for each element of the network. The determinism is guaranteed for a bounded latency and a correct sizing of the queues for each element of the network.

Finally, the switching tables of the frame switches are updated in 295. These switching tables unequivocally set the routing of the links on the network.

The routing process can be implemented a first time when the network is activated and/or each time a virtual link must be modified or added.

The topological constraints mentioned above are of two distinct types: absolute constraints and relative constraints.

The absolute constraints weigh on the routing of a virtual link independently of the presence of other links on the network. For example, in the case of an AFDX network on board an aircraft, the "left" and "right" "sides" of the network, corresponding to the "left" and "right" sides of the airplane, are supplied by different supply buses. So that the failure of one power supply does not endanger the entire network, the following topological constraints are imposed:

a virtual link from a source terminal located on one side of the network and leading to a destination terminal located on the opposite side can cross the border separating the two sides of the network only once. If the virtual link is of the multipoint type, the constraint is applied to each path forming the link;

a virtual link from a source terminal located on one side of the network and serving a destination terminal located on the same side cannot cross the border separating the two sides of the network.

This rule is easily generalized to the case in which the network can be partitioned into any plurality of distinct zones, on the condition that any terminal of a zone can serve any terminal of another zone without passing through a third zone. The various zones of the network are, for example, supplied by independent power supply sources. The intra-zone virtual links are routed within the zone in question, while the inter-zone virtual links cross the border separating said zones only once, without passing through a third zone.

Other absolute topological constraints can be established, such as collocation or segregation with an element of the network. By this, we mean that it can be specified that the virtual link necessarily passes through a given element of the network (for example, a switch or a physical connection), or, on the contrary, that it necessarily avoids this element. Collocation with a plurality of elements of the network is considered to be capable of leading to unequivocal routing of the virtual link. The virtual link is then said to be "fixed".

The relative topological constraints concern the virtual links with one another. Thus, it is possible to establish collocation or segregation constraints between virtual links. By this, we mean that it can be specified that two virtual links must pass through the same switches of the network, or, on the contrary, that they must not share any common switch. The relative topological constraints may concern different virtual links of the same functional bundle, in which case the constraint presented is a segregation constraint. They can also concern virtual links belonging to distinct functional bundles. In both cases, the topological constraints on collocation/segregation of a virtual link can be expressed with regard to links already routed or links to be routed simultaneously with said link.

It is possible that relative topological constraints expressed in terms of collocation and/or segregation are too strict to enable a routing solution to be obtained. In this case, some, or even all, of these constraints are relaxed, as indicated below.

A set of virtual links is considered, in which the routing is performed simultaneously, as their individual independent routing cannot be envisaged. Each of these virtual links generally includes one (point-to-point link) or more (multipoint link) path(s) All of the paths forming these virtual links, hereinafter referred to as a group of virtual links, can be partitioned into sub-groups, with a path being capable of belonging to a plurality of sub-groups. Generally, a sub-group corresponds to an instance of the function provided by said set of virtual links. In other words, the various sub-groups represent a certain degree of redundancy for the performance of a single function.

If $N_{sg}$ is the number of sub-groups of the group of paths, a relaxed segregation constraint is imposed on said set of virtual links, according to which at most $n_{sg}$ sub-groups among $N_{sg}$, with $0 \leq n_{sg} < N_{sg}$, can be invalidated by the failure of a switch. The case $n_{sg}=0$ corresponds to the specific situation in which no invalidated sub-group is tolerated. By failure of a switch, we mean either an erroneous or absent switch, or a corruption of switched frames. By invalidated sub-groups, we mean a sub-group of which all of the paths are affected by the failure of the same switch.

It is understood that a relaxed segregation constraint provides more flexibility than a segregation constraint insofar as it takes into account the redundancy of the network and is not applied in an undifferentiated manner to all of the paths forming a virtual link.

Examples of relaxed segregation constraints are provided in the appendix.

As described above, after having selected a subset of possible candidates satisfying the aforementioned topological constraints, the routing algorithm searches among the possible candidates for the one(s) that minimize(s) one or more cost functions.

A first cost function considered is the number of switches traversed by the virtual link. More specifically, if the link is of the point-to-point type, it is sought to minimize the number of switches traversed by this link. If the link is of the multipoint type, the minimization concerns the number of switches traversed for each of the paths forming the link. A small number of switches traversed enables the probability of a failure of the virtual link or of each path forming said link to be reduced.

A second cost function concerns the multipoint virtual links. It is defined as the number of switches common to the paths forming a multipoint link.

A third cost function concerns the bundles of links. It is defined as the number of switches common to the virtual links belonging to the same bundle.

The minimization of the second or the third cost function enables, depending on the case, the probability of a joint failure of the paths of the same virtual link or of the virtual links of the same bundle to be reduced.

A fourth cost function also concerns the bundles of links. This is defined as the total number of switches traversed by all of the virtual links of the same bundle.

A fifth cost function is defined as the flow rate of the output port of the most heavily loaded switch of the network. The minimization of this function is intended to optimize the distribution of the traffic load within the network.

These examples of cost functions are in no way limiting. Other cost functions can be considered, insofar as they are intended in particular to quantify the impact of the failure of an element or a plurality of elements of the network.

The successive minimization of cost functions can lead to a set of sub-optimal solutions. According to an alternative embodiment, a linear combination of cost functions is produced by means of weighting coefficients reflecting the relative importance of these functions in the routing, and the new cost function thus produced is minimized on the set of possible solutions. Similarly, the new cost function can be produced as a product of the cost functions, in which each one is assigned an exponent reflecting its relative importance in the routing.

FIGS. 3A to 3E show the mechanism for minimizing cost functions in the case of a multipoint virtual link.

Figure 1:
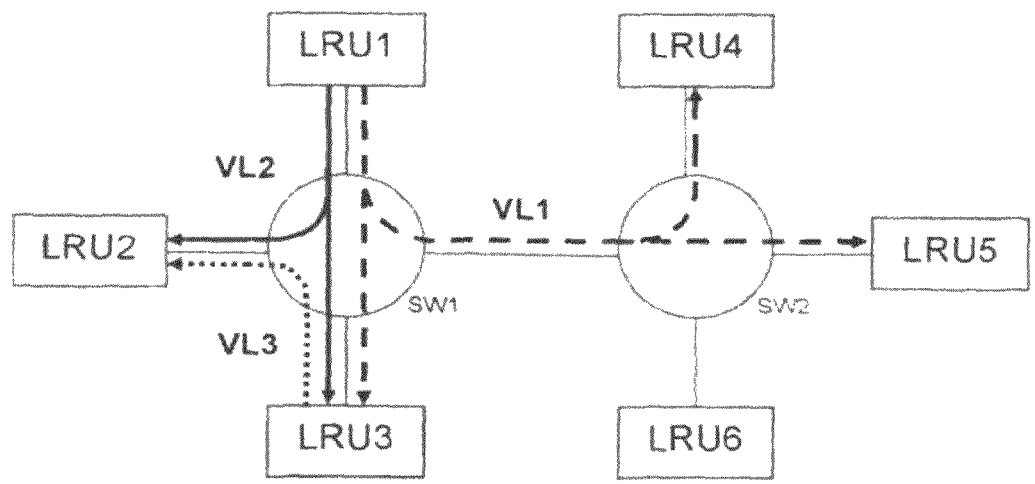
FIG. 1 diagrammatically shows an example of AFDX networks.
Figure 3E:
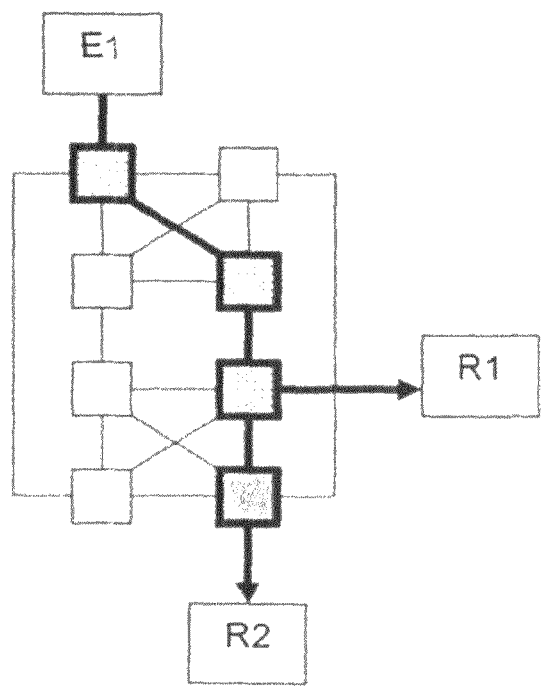
FIGS. 3A to 3E show a mechanism for minimizing cost functions in the case of a multipoint virtual link.

The virtual link to be routed comes from the source terminal $E_1$ and serves the destination terminals $R_1$ and $R_2$. It is assumed that the paths satisfying the topological constraints have been pre-selected. The minimization of the first cost function is performed by searching among each of the possible paths connecting $E_1$ to $R_1$ and $E_1$ to $R_2$, those that traverse the minimum number of switches. In this case, the minimum number is 3 for the path $E_1$-$R_1$ as well as for the path $E_1$-$R_2$. The optimal solutions are shown in FIGS. 3A to 3D. However, it is noted that the solution shown in FIG. 3E is not optimal: indeed, it minimizes the number of switches on the entire virtual link, but not on each of its constituent paths (the path connecting $E_1$-$R_2$ has a cost of 4).

Figure 3A:
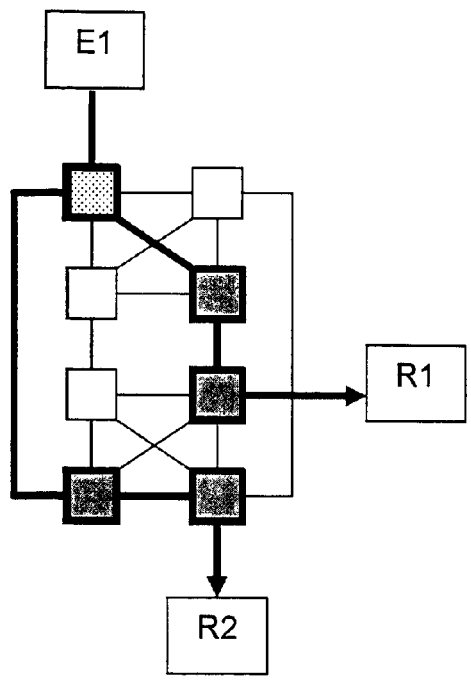
Figure 3B:
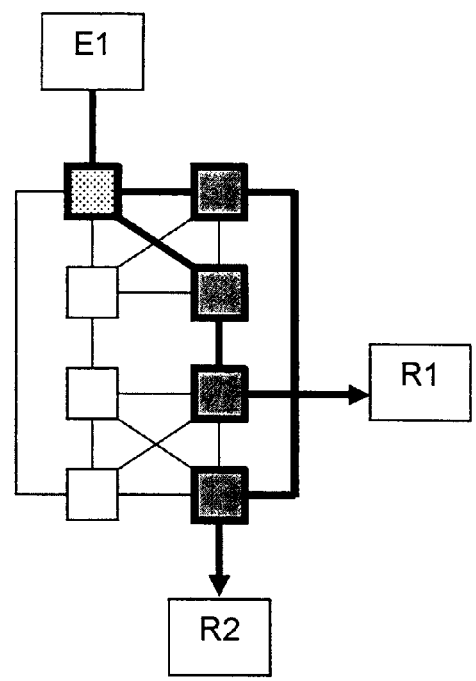
Figure 3C:
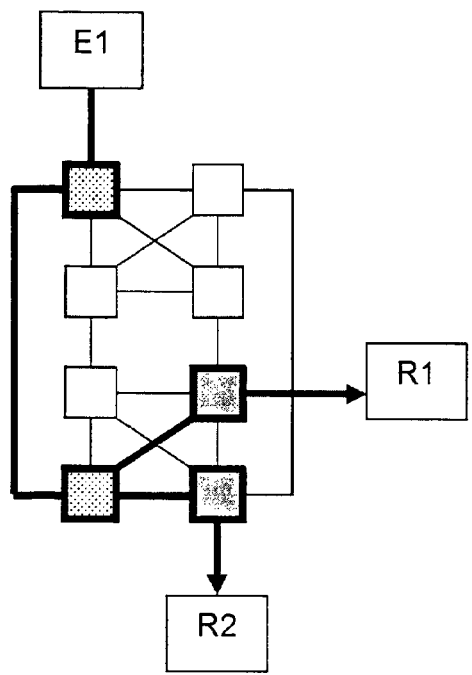
Figure 3D:
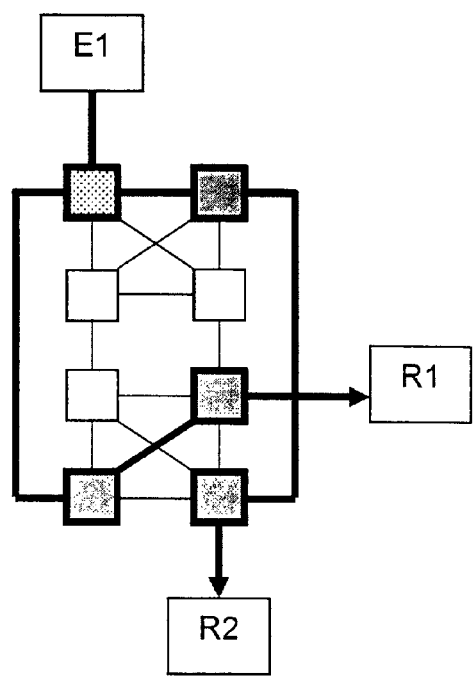

The minimization of the second cost function means that, among the four previous solutions, those shown in FIGS. 3A, 3B and 3D are kept. Indeed, for those, the number of switches common between the two paths is equal to 1, while it is equal to 2 for that in FIG. 3C.

The minimization of the fifth cost function makes it possible to decide between the three solutions kept in the previous step. By default, the solution chosen is chosen arbitrarily from the remaining solutions.

The routing problem amounts to a problem of minimizing a cost function/cost functions under constraints. Advantageously, the cost functions under constraints are expressed in the form of linear inequalities and the cost functions are linear expressions of decision variables. The minimization can then be performed using the simplex algorithm. It is noted that the simplex algorithm enables a problem of the following type to be solved:

$$\underset{x}{\mathrm{Argmin}}(b^T x) \text{ with } Ax \geq c \text{ and } x \geq 0 \quad (1)$$

where $b^T$ is the vector representing a linear form (cost function), x is the vector of the decision variables (positive), A represents the constraint matrix and c is a constant vector.

In practice, the routing algorithm has, at the input, the list of switches, noted SS and, for each pair of source and destination terminals, the list of paths making it possible to go from the first to the second, with each path being described by an ordered list of switches through which it passes. Below PP will denote the list of paths indexed. Advantageously, PP will previously have been reduced to a list of paths already satisfying certain absolute topological constraints, for example those relating to the partition into independent zones.

Then, the matrices $C_{ps}$, $C_{fs}$, $C_{ls}$, $C_{pss}$ are produced, with the first three having dimensions P×S and the last having dimensions P×S×S where P is the total number of paths indexed in the file and S is the total number of switches of the network, with the elements of these matrices being defined by:

$c_{ps}(p,sw)=1$ if sw belongs to the path p and $c_{ps}(p,sw)=0$ if not;
$c_{fs}(p,sw)=1$ if sw is the first switch of p and $c_{fs}(p,sw)=0$ if not;
$c_{ls}(p,sw)=1$ if sw is the last switch of p and $c_{ls}(p,sw)=0$ if not;
$c_{pss}(p,sw_1,sw_2)=1$ if $sw_1$ and $sw_2$ are successive switches of the path p and $c_{pss}(p,sw_1,sw_2)=0$ if not;
where p is the identifier of a path between the two terminals and where sw, $sw_1$, $sw_2$ are the identifiers of switches of the network.

To simplify the routing algorithm, it is considered that any virtual link is part of a functional bundle, which bundle can be reduced as necessary to a single link. FF denotes the list of functional bundles.

A bundle f of FF is determined by its attributes:
f.profile indicates whether the bundle f contains a single virtual link (f.profile=1) or not (f.profile=0);
f.ocs gives the list identifiers of the virtual links belonging to the bundle.

A virtual link vl of a bundle f is defined by its attributes:
vl.f gives the identifier of the bundle to which the link belongs;
vl.cost indicates the cost in terms of traffic on the virtual link; this cost can be expressed in terms of traffic on the virtual link; this cost can be expressed, for example, as a function of the transmission interval and maximum frame length pair;
vl.rted indicates whether the link has already been routed (vl.rted=1) or not (vl.rted=0);
vl.txsw gives the identifier of the switch connected to the source terminal;
vl.rxsw gives the identifier of the switch connected to the destination terminal (point-to-point link) or the identifiers or switches respectively connected to the destination terminals (multipoint link).

A path b forming a virtual link vl is defined by its attributes:
b.vl identifier of the virtual link to which it belongs;
b.swDest identifier of the switch connected to the destination terminal served by said path.

In addition, GG denotes the list of groups of paths forming virtual links subject to a relaxed segregation constraint. Each group g of GG is defined by:
an attribute g.sgErrmax indicating the maximum acceptable number of subgroups invalidated in the group;
the list of its subgroups g.sglist.

Finally, SG denotes the list of subgroups relating to the various groups of GG. Each subgroup sg of SG is defined by:
an attribute sg.group indicating the group to which it belongs;
the list sg.pathlist of paths forming this subgroup.

The following decision variables are also introduced, all with positive values:
vlPath[vl,p] is equal to 1 if the path p forms the virtual link vl and is equal to 0 if not. It is noted that a path p forms vl if this path leaves the switch connected to the terminal vl.txsw and arrives at one of the switches of vl.rxsw;
vlBrSw[vl,swDest,sw] is equal to 1 if the path forming the virtual link vl ending with swDest passes through the switch sw and is equal to 0 if not;
vlBrPerSw[vi,sw] is equal to the number of paths forming the virtual link vl passing through the switch sw;
comBrSw[vl,sw] is equal to 1 if a plurality of paths forming the virtual link vl pass through the switch sw;
vlSw[vl,sw] is equal to 1 if the virtual link vl passes through the switch sw and is equal to 0 if not;
fvlPerSw[f,sw] is equal to the number of virtual links of the functional bundle f passing through the switch sw;
comfSw[f,sw] is equal to 1 if a plurality of virtual links of the functional bundle f pass through the switch sw and is equal to 0 if not;
fSw[f,sw] is equal to 1 if one of the virtual links of the functional bundle f passes through the switch sw and is equal to 0 if not;
vlSwNb[vl,$sw_1$,$sw_2$] is equal to the number of paths forming the virtual link vl passing successively through the switches $sw_1$,$sw_2$;
vlSw[vl,$sw_1$,$sw_2$] is equal to 1 if there is a path forming the virtual link vl passing successively through the switches $sw_1$,$sw_2$;
trfCst[$sw_1$,$sw_2$] is the sum of trfCstPast[$sw_1$,$sw_2$] and the traffic cost between the switches $sw_1$,$sw_2$ cumulated on the current subset of virtual links to be routed;
fixvl[$sw_1$,$sw_2$] is equal to 1 if there is a virtual link already routed from said current subset, passing successively through the switches $sw_1$ and $sw_2$, and is equal to 0 if not;

sgSw[sg,sw] is equal to 1 if the switch sw is common to all of the paths forming the subgroup sg and is equal to 0 if not.

The basic constraint that is imposed on a solution (or candidate virtual link) is that the path(s) forming the solution come from the source terminal and end(s) at the destination terminal, i.e.:

$$\forall f \in FF; \forall vl \in f.ocs; \forall p \in PP \quad (2)$$
$$vlPath[vl, p] \le c_{fs}(p, vl.txsw) \text{ and}$$
$$vlPath[vl, p] \le \sum_{sw \in vl.rxsw} c_{ls}(p, sw)$$

and that, for each destination terminal of the virtual link, there be a single constituent path from the source terminal, i.e.:

$$\forall f \in FF; \forall vl \in f.ocs; \forall sw \in vl.rxsw; \quad (3)$$
$$\sum_{p \in PP} vlPath[vl, p].c_{ls}(p, sw).c_{fs}(p, vl.txsw) = 1$$

Most of the absolute topological constraints are capable of the same formalism. The remaining constraints are taken into account, as indicated above, by restricting the set PP from the start.

The relative topological constraints can also be expressed on the basis of the aforementioned decision variables in the form of linear inequalities or equalities. Thus, for each set Π of constituent paths to be segregated, i.e. not capable of sharing any common switch, the segregation constraint is expressed by:

$$\forall sw \in SS; \sum_{b \in \Pi} vlBrSw[b.vl, b.swDest, sw] \le 1 \quad (4)$$

Similarly, for a set Π of constituent paths to be subjected to a collocation constraint, i.e. that must pass through the same switches:

∀sw∈SS; ∀b₁, b₂∈Π;

$$vlBrSw[b_1.vl, b_1.swDest, sw] = vlBrSw[b_2.vl, b_2.swDest, sw] \quad (5)$$

Of course, the constraints must be verified for all of the segregation and collocation instances to be taken into account, each instance being associated with a determined set Π.

Alternatively, if relaxed segregation constraints are used, for any group g∈GG, there will be paths forming virtual links, subject to such a constraint:

$$\forall sw \in SS, \sum_{\substack{sg \in g.sglist \\ sg.group=g}} sgSw[sg, sw] \le g.sgErrmax \quad (5')$$

in which the decision variable sgSw[sg,sw] is defined by the following constraints:

$$-(Q+1) + (Q+1).sgSw[sg, sw] \le \quad (5'')$$
$$\sum_{b \in sg.pathlist} vlBrSw[b.vl, b.swDest, sw] - \text{Card}(sg.pathlist)$$

and $$\sum_{b \in sg.pathlist} vlBrSw[b.vl, b.swDest, sw] - \text{Card}(sg.pathlist) + 1 \le$$
$$Q.sgSw[sg, sw]$$

with $Q = \max_{sg \in SG}(\text{Card}(sg.pathlist))$.

The expressions (5") indeed mean:

$sgSw[sg, sw] = 1$ if
$$\sum_{b \in sg.pathlist} vlBrSw[b.vl, b.swDest, sw] \ge \text{Card}(sg.pathlist)$$
and $sgSw[sg, sw] = 0$ if not.

The cost functions are also expressed on the basis of the aforementioned decision variables.

For example, the first cost function $CF_1$ intended to independently minimize the number of switches traversed by the paths forming a virtual link can be expressed by:

$$CF_1 = \sum_{f \in FF} \sum_{vl \in f.ocs} \sum_{p \in PP} vlPath[vl, p].card(p) \quad (6)$$

where card(p) is the cardinality of the numbered list p, in other words the number of switches traversed by the path p.

It is possible to mathematically show that the second cost function, intended to minimize the number of switches common to the various paths of each multipoint virtual link can be expressed by:

$$CF_2 = \sum_{\substack{f \in FF \\ f.profile=1}} \sum_{vl \in f.ocs} \sum_{sw \in SS} comBrSw[vl, sw] \quad (7)$$

Similarly, the third cost function, intended to minimize the number of switches common to the virtual links of a single functional bundle can be written:

$$CF_3 = \sum_{\substack{f \in FF \\ f.profile=0 \\ sw \in SS}} comfSw[f, sw] \quad (8)$$

It is also possible to show that the fourth cost function, intended to minimize the number of switches traversed by links of a functional bundle can simply be expressed by:

$$CF_4 = \sum_{\substack{f \in FF \\ f.profile=0 \\ sw \in SS}} fSw[f, sw] \quad (9)$$

The fifth cost function is intended to route the virtual links so as to pass through the switches with the lightest loads. It is possible to determine, on the basis of the status file of the network and the links to be routed, the traffic cost between two adjacent switches. The term "adjacent switches" is used here to refer to switches $sw_1, sw_2$ connected by a direct physical link. More specifically, it is first determined, for each of any pairs of adjacent switches $sw_1, sw_2$, whether there is at least one virtual link passing successively through them:

$$\forall f \in FF; \forall vl \in f.ocs; \forall sw_1, sw_2 \in SS; \tag{10}$$

$$vlSwNb[vl, sw_1, sw_2] = \sum_{p \in PP} vlPath[vl, p].c_{pss}(p, sw_1, sw_2)$$

The decision variable $vlSw[vl, sw_1, sw_2]$ is expressed as a function of $vlSwNb[vl, sw_1, sw_2]$ by means of the following linear constraints:

$\forall f \in FF; \forall vl \in f.ocs; \forall sw_1, sw_2 \in SS;$ $vlSw[vl, sw_1, sw_2] \leq vlSwNb[vl, sw_1, sw_2]$ $$vlSwNb[vl, sw_1, sw_2] \leq (P+1) vlSw[vl, sw_1, sw_2] \tag{11}$$

This set of linear constraints indeed means:

$vlSw[vl, sw_1, sw_2] = 0$ if $vlSwNb[vl, sw_1, sw_2] = 0$ $vlSw[vl, sw_1, sw_2] = 1$ if $vlSwNb[vl, sw_1, sw_2] \geq 1$ \tag{12}

Similarly, the decision variable $fixvl[sw_1, sw_2]$ is expressed as a function of the sum $$\sum_{\substack{f \in FF \\ vl \in f.ocs \\ vl.rted=0}} vlSw[vl, sw_1, sw_2]$$

by means of the following linear constraints:

$$\forall f \in FF; \forall vl \in f.ocs; \forall sw_1, sw_2 \in SS; \tag{13}$$

$$fixvl[sw_1, sw_2] \leq \sum_{\substack{f \in FF \\ vl \in f.ocs \\ vl.rted=0}} vlSw[vl, sw_1, sw_2]$$

$$\sum_{\substack{f \in FF \\ vl \in f.ocs \\ vl.rted=0}} vlSw[vl, sw_1, sw_2] \leq (M+1) fixvl[sw_1, sw_2]$$

with $M = F. \max_{f \in FF}(Card(f.ocs))$ where $F = Card(FF)$

This set of linear constraints indeed means:

$$fixvl[sw_1, sw_2] = 0 \text{ if } \sum_{\substack{f \in FF \\ vl \in f.ocs \\ vl.rted=0}} vlSw[vl, sw_1, sw_2] = 0 \tag{14}$$

$$fixvl[sw_1, sw_2] = 1 \text{ if } \sum_{\substack{f \in FF \\ vl \in f.ocs \\ vl.rted=0}} vlSw[vl, sw_1, sw_2] \geq 1$$

The traffic cost of the output port of $sw_1$ connected to $sw_2$, is then evaluated for any pair of adjacent switches:

$$\forall sw_1, sw_2 \in SS; \tag{15}$$

$$trfCst[sw_1, sw_2] = trfCstPast[sw_1, sw_2] + \sum_{\substack{f \in FF \\ vl \in f.ocs \\ vl.rted=0}} (vl.cost).vlSw(vl, sw_1, sw_2)$$

where $trfCstPast[sw_1, sw_2]$ is the traffic cost between the switches $sw_1, sw_2$, i.e. at the output port of $sw_1$ connected to $sw_2$, cumulated over all of the virtual links already routed.

In other words, the calculation of the traffic cost is performed on the links already routed (vl.rted=1) and on the links to be routed (vl.rted=0). The value $trfCstPast[sw_1, sw_2]$ is initialized by that of the traffic cost induced by the fixed virtual links, i.e. of which the routing is unequivocal. It can be stored in the status file of the network.

The fifth cost function is then expressed as follows:

$$CF_5 = \max_{sw_1, sw_2 \in SS}(trfCstw[sw_1, sw_2]) \tag{16}$$

by imposing the linear constraints:

$$\forall sw_1, sw_2 \in SS; \tag{17}$$

$trfCstw[sw_1, sw_2] - trfCst[sw_1, sw_2] \geq M(fixvl[sw_1, sw_2] - 1)$ $trfCstw[sw_1, sw_2] \leq trfCst[sw_1, sw_2]$ $trfCstw[sw_1, sw_2] \leq Mfixvl[sw_1, sw_2]$ $trfCst[sw_1, sw_2] < M$ with $M = F. \max_{f \in FF}(Card(f.ocs)). \max_{\substack{f \in FF \\ vl \in f.ocs}}(vl.cost)$ This set of linear constraints indeed means, for any pair of switches $sw_1, sw_2$:

$trfCstw[sw_1, sw_2] = trfCst[sw_1, sw_2]$ if $fixvl[sw_1, sw_2] = 1$ $trfCstw[sw_1, sw_2] = 0$ if $fixvl[sw_1, sw_2] = 0$ \tag{18}

This makes it possible to consider, in the decision variable $trfCstw[sw_1, sw_2]$, only the contribution of the virtual links to be routed and, among these, only those that pass through $sw_1, sw_2$.

If it is desired to perform a joint minimization of the cost functions, a new function $$CF = \sum_i \alpha_i CF_i$$

is produced, a linear combination of the functions $CF_i$ with the weighting coefficients $0 \leq a_i \leq 1$. This is ultimately the search for the minimum cost function CF that gives the optimal routing solution in the form of decision values. If a plurality of optimal solutions exist in the above sense, one of them is chosen arbitrarily.

Alternatively, the cost functions can be minimized one after the other, in order of decreasing priority, with each one being on the subset of solutions provided by the previous minimization step. In this embodiment, constraints can be taken into account between the minimization steps.

Whether it is by joint or successive minimization of the cost functions, the overall optimization on the set FF can lead to very long calculation times if the number of virtual links is high.

Advantageously, this set is then partitioned into independent subsets with the lowest cardinality possible, and the relative topological constraints and the minimization of the cost functions are applied only within each subset. Given that the virtual links of a single functional bundle cannot be routed independently, each subset is necessarily formed by one or more bundles. The routing algorithm is applied in sequence to said subsets.

It should be noted however that the independence of the subsets can be incomplete. Thus, the minimization of the cost function $CF_5$ in principle involves all of the virtual links to be routed. In this case, the subsets of virtual links with the least routing freedom are preferred, for example those of which the links will in principle be shorter, with these subsets being treated in priority by the routing process.

Routing examples according to the invention will be provided below for an on-board network. In these examples, the cost functions are minimized successively. The routing unit considered is in this case the functional bundle, with a virtual link being considered to be a bundle with a single link.

Figure 4:
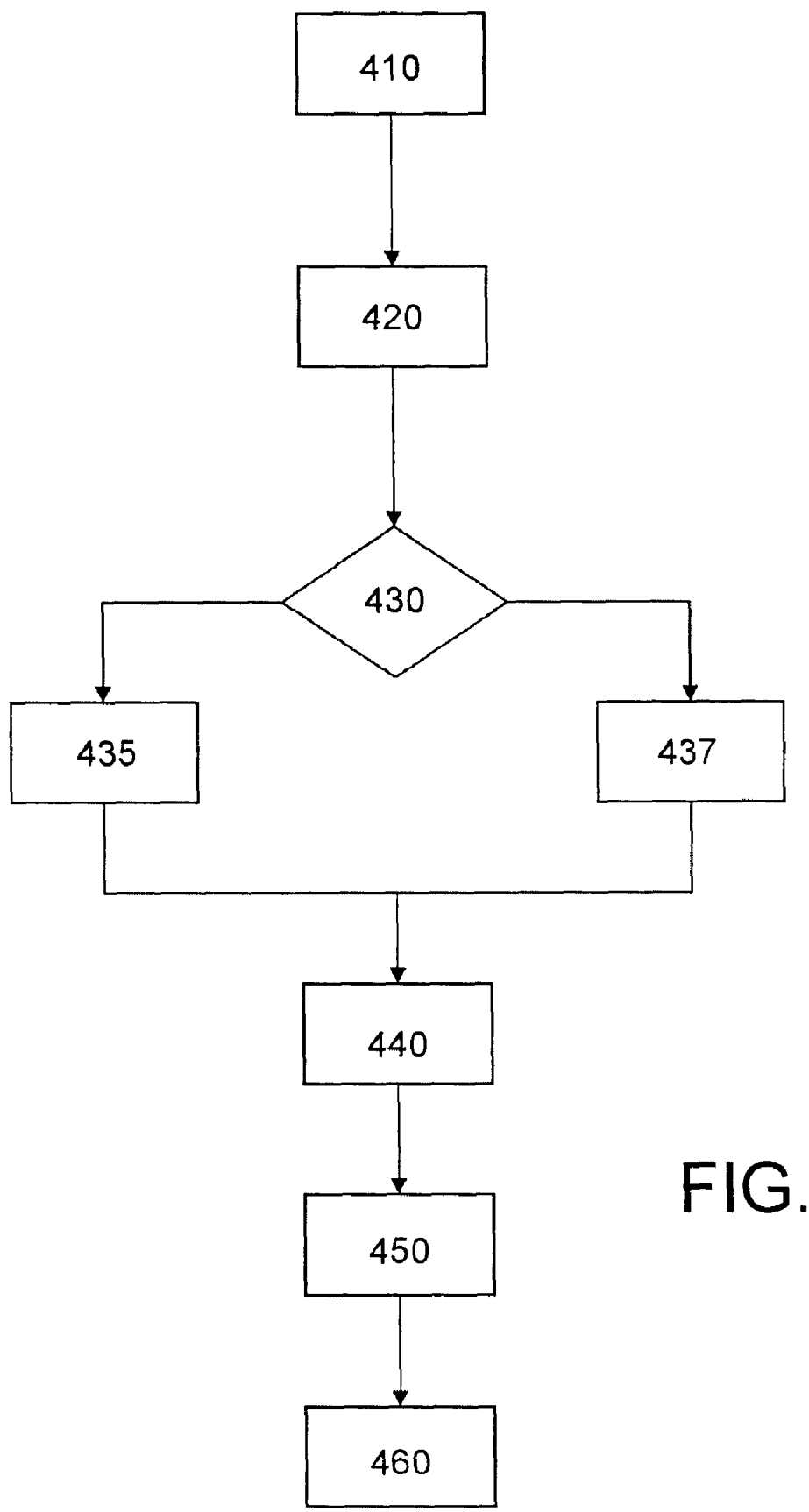
FIG. 4 shows an example of routing for a point-to-point virtual link.

FIG. 4 diagrammatically shows an example of routing of a point-to-point virtual link (or a one-link bundle), between a source terminal $E_1$ and a destination terminal $R_1$.

In step 410, the basic constraint is applied in order to determine the possible paths between the source terminal and the destination terminal.

In step 420, the relative topological constraints are applied, taking into account virtual links that have already been routed, if they exist, then, in 430, it is determined whether the terminals are on the same side of the network. If this is the case, in 435, a non-crossing (intra-zone routing) constraint is applied, and the cost function $CF_1$ is minimized on the set of possible solutions by the previous constraints. However, if the terminals are not on the same side of the network, in 437, a crossing (one single inter-zone crossing) constraint is applied, and, as for the first case, the cost function $CF_1$ is minimized on the set of possible solutions.

If steps 435 or 437 do not provide a single routing solution, the process is continued by minimizing, in 440, the cost function $CF_5$ on the remaining solutions. The status file of the network is updated in 450.

Figure 5:
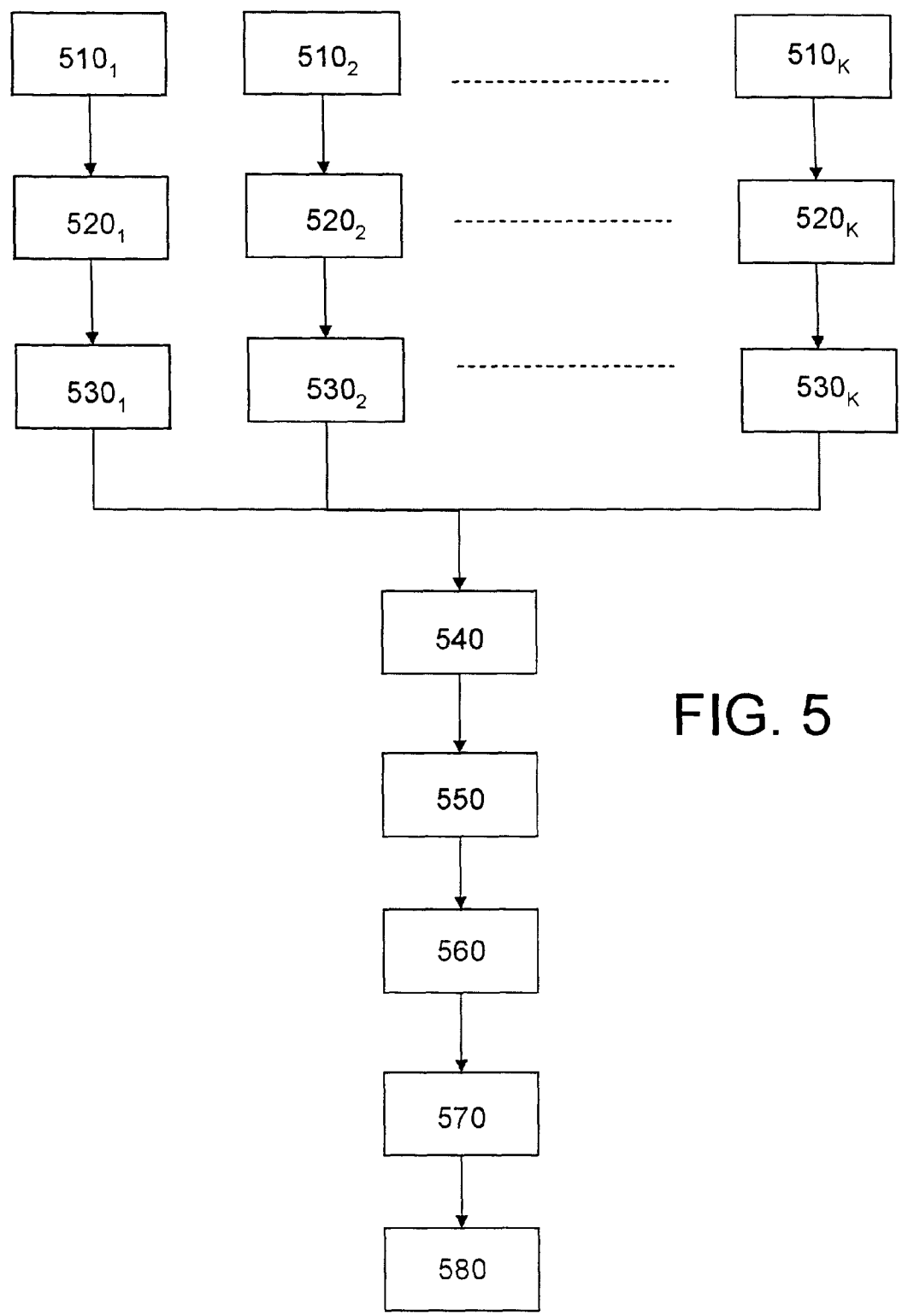
FIG. 5 shows an example of routing for a multipoint virtual link.

FIG. 5 diagrammatically shows an example of routing a multipoint virtual link (or one-link bundle), between a source terminal $E_1$ and a plurality K of destination terminals $R_1$, $R_2, \ldots, R_K$.

For each pair of terminals $(E_1, R_k)$, in $510_1, 510_2, \ldots, 510_K$, the basic constraint is applied so as to keep only the possible paths between $E_1$ and $R_1, R_2, \ldots, R_K$.

In $520_1, 520_2, \ldots, 520_K$, the relative topological constraints are applied individually to the various paths, taking into account links already routed.

In each of the K sets of possible paths, the cost functions $CF_1$ are minimized individually, in $530_1, 530_2, \ldots, 530_K$, respectively.

Then, in 540, all of the combinations of paths given by $530_1, 530_2, \ldots, 530_K$, are produced, respectively. A set of possible routing solutions for the virtual link in question is thus obtained.

In 550, the cost function $CF_2$ is then minimized on the set of these possible solutions.

If step 550 does not provide a single solution, in 560, the cost function $CF_4$ is minimized on the set of remaining solutions.

If step 560 still does not provide a single solution, the cost function $CF_5$ is minimized in 570 on the set of remaining solutions, and the status file of the network is updated in 580.

Figure 6:
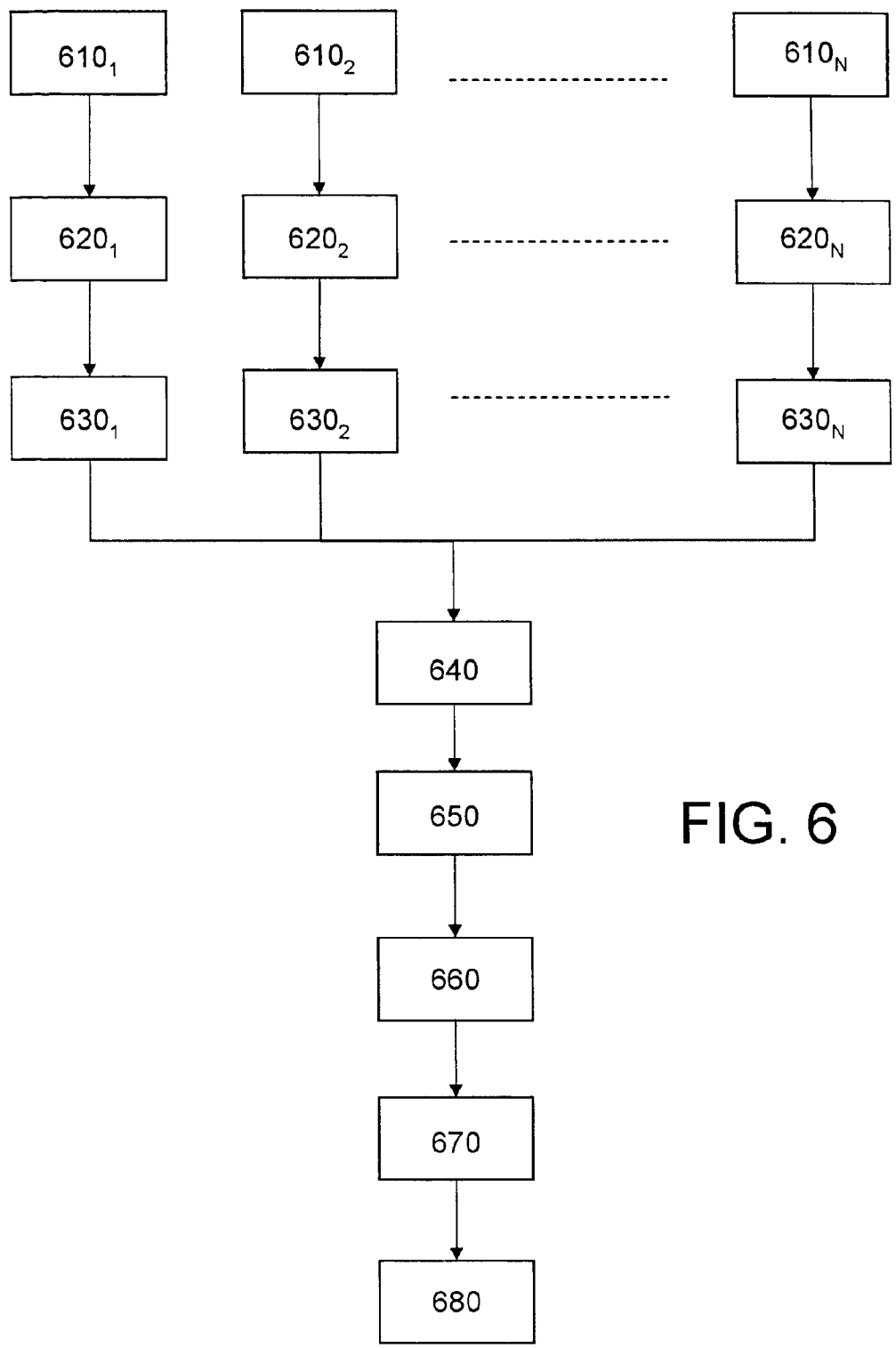
FIG. 6 shows an example of routing for a bundle of point-to-point virtual links.

FIG. 6 diagrammatically shows an example of routing of a bundle of N point-to-point virtual links. Each link is from a source terminal $E_i$ and serves a destination terminal $R_i$, $1 \leq i \leq N$.

For each pair of terminals $(E_i, R_i)$ in $610_i$, the basic constraint is applied so as to keep only the paths possible between $E_i$ and $R_i$.

Steps $620_i, 630_i$, and 640 are equivalent to steps $520_k, 530_k$, 540 except that, in 640, all of the possible routing solutions are obtained for the bundle of links.

Then, in 650, the cost function $CF_3$ is minimized on the set of possible solutions.

If step 650 does not provide a single solution, in 660, the cost function $CF_4$ is minimized on the set of remaining solutions.

If step 660 still does not provide a single solution, the cost function $CF_5$ is minimized in 670 on the set of remaining solutions, and the status file of the network is updated in 680.

Figure 7:
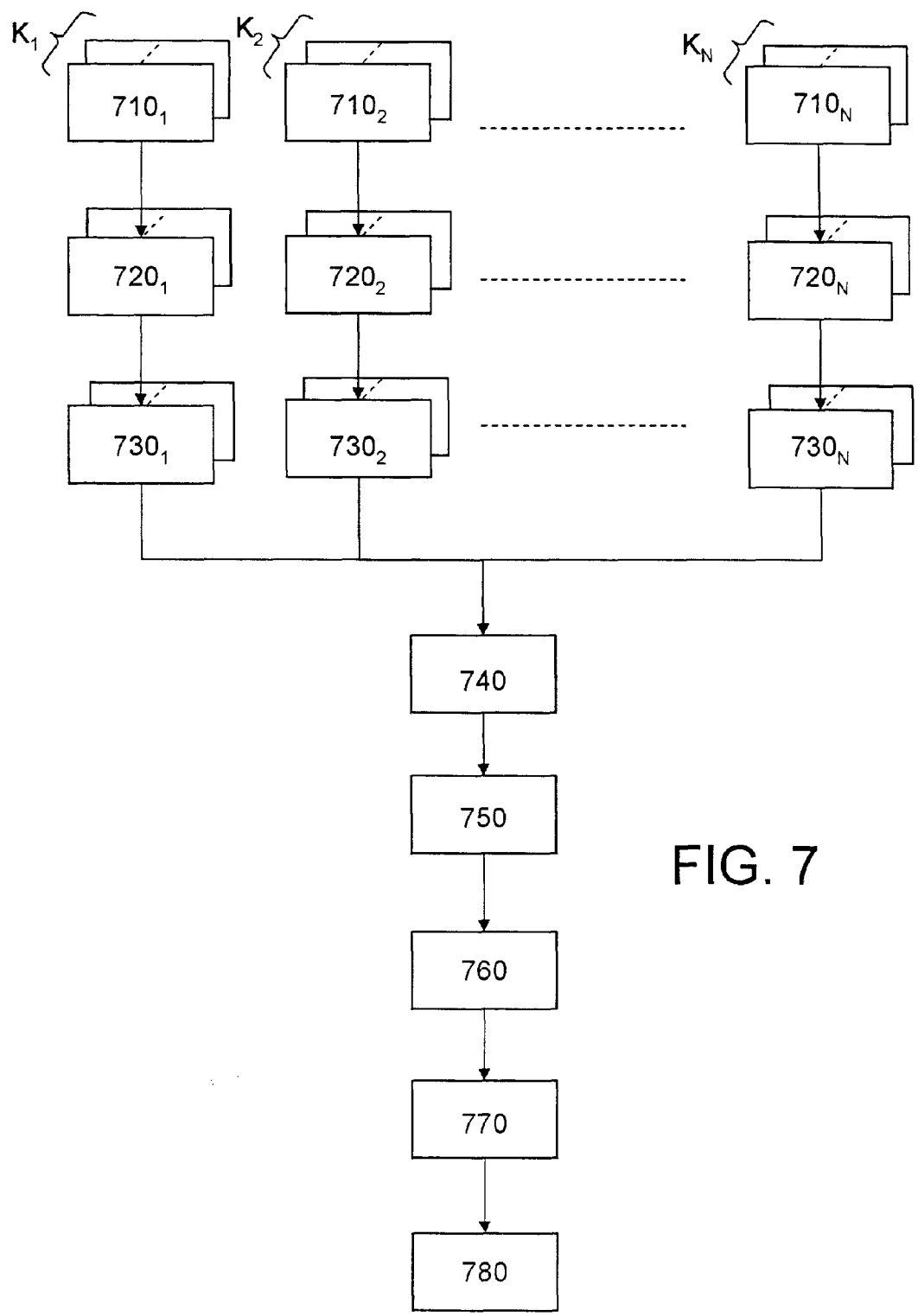
FIG. 7 shows an example of routing for a bundle of multipoint virtual links.

FIG. 7 diagrammatically shows an example of routing of a bundle of N multipoint virtual links. It is assumed that each virtual link $VL_i$ is from a source terminal $E_i$ and serves $K_i$ destination terminals $R_{ik}$ with $1 \leq i \leq N$ and $1 \leq k \leq K_i$.

In $710_i$ the basic constraint is applied for all of the pairs of terminals $(E_i, R_{ik})$, $1 \leq k \leq K_i$ then in $720_i$ the relative topological constraints are applied, as in FIG. 5.

At the end of $720_i$, $K_i$ sets $P_{ik}$ of possible paths are obtained to form the virtual link $VL_i$, with a set $P_{ik}$ being relative to a given pair $(E_i, R_{ik})$.

In step $730_i$, the cost function $CF_1$ is minimized on each of these sets, as in steps $530_1$ to $530_K$ of FIG. 5.

In step 740, all of the possible combinations of all of the paths kept in step $730_i$ are produced, with the understanding that, for each combination, only one path per pair $(E_i, R_{ik})$ is selected. Each combination thus corresponds to $K_1 + K_2 + \ldots + K_N$ paths kept. Thus, a set of possible routing solutions is obtained for the various virtual links $VL_i$, i.e. a set of possible routing solutions of the bundle.

The remainder of the organizational chart is identical to that of FIG. 6, and steps 750, 760, 770 and 780 are respectively identical to those shown in 650, 660, 670 and 680.

APPENDIX

The relaxed segregation constraints generally concern a group of paths forming virtual links to be routed simultaneously.

Figure 8:
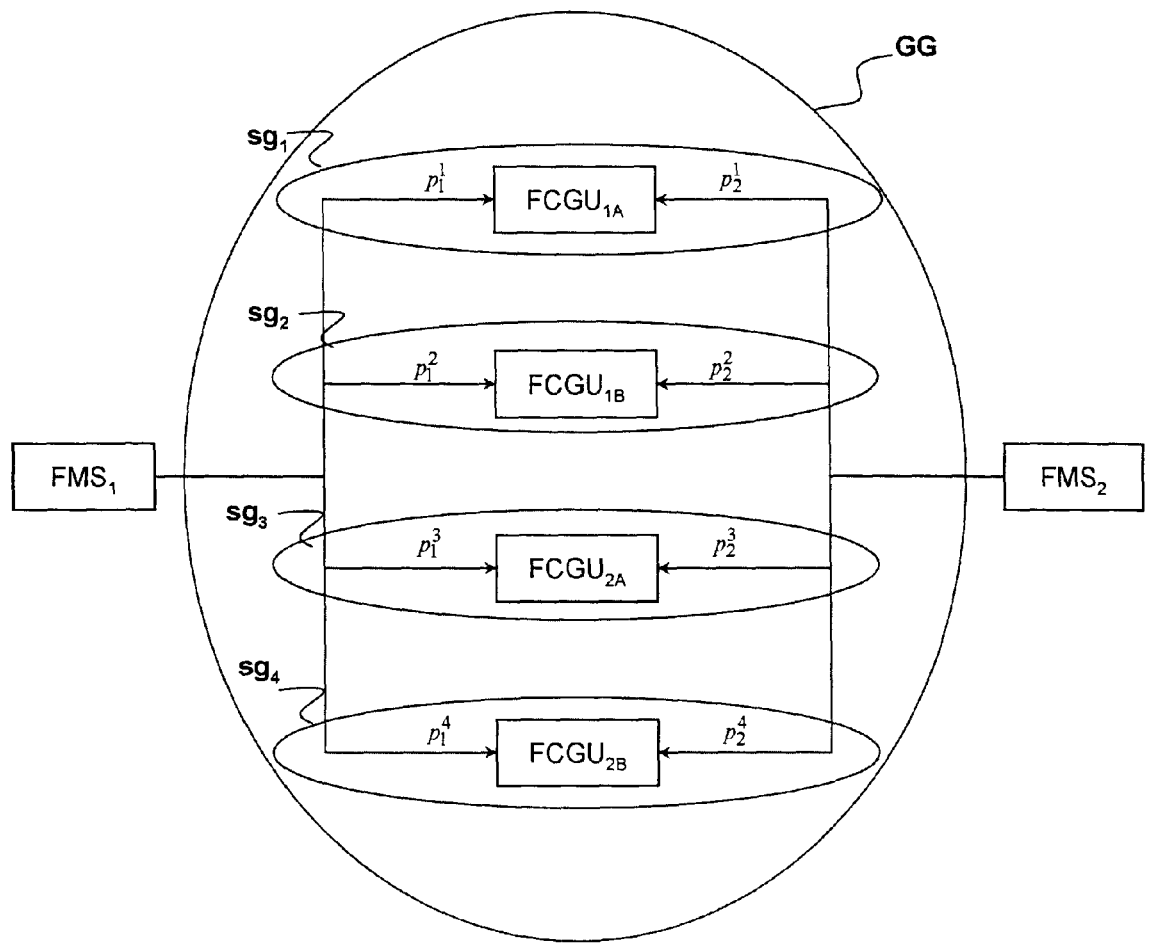
FIG. 8 shows an example of a group of paths forming virtual links, subject to a relaxed segregation constraint.

In FIG. 8, such a group of paths is shown symbolically.

It is assumed that three virtual links $VL_1, VL_2, VL_3$ are to be routed simultaneously, and that their constituent paths are:

$$VL_1 = \{p_1^1, p_1^2, p_1^3, p_1^4\};$$

$$VL_2 = \{p_2^1, p_2^2, p_2^3\};$$

$$VL_3 = \{p_3^1, p_3^2\};$$

In the example shown, the group GG of paths subjected to the relaxed segregation constraint is partitioned into $N_{sg} = 4$ subgroups $sg_1 = \{p_1^1, p_2^1\}$; $sg_2 = \{p_1^2, p_2^2\}$; $sg_3 = \{p_2^2; p_1^3\}$, $sg_4 = \{p_3^1\}$.

The relaxed segregation constraint is expressed by a maximum number $n_{sg} < N_{sg}$ of subgroups capable of being invalidated by the failure of a single switch (for example, the failure of a switch will affect paths $p_1^1, p_2^1$ de $sg_1$). In other words, at least $N_{sg}-n_{sg}$ subgroups must each contain at least one path not corrupted by the failure of a switch.

An example of the application of a relaxed segregation constraint is provided below. The routing of virtual links between the flight management systems (FMS) and the flight control and guidance unit (FCGU) are considered. The first are classically responsible for assisting the pilot in navigation and flight management operations. The second calculate guidance and flight control orders.

Figure 9:
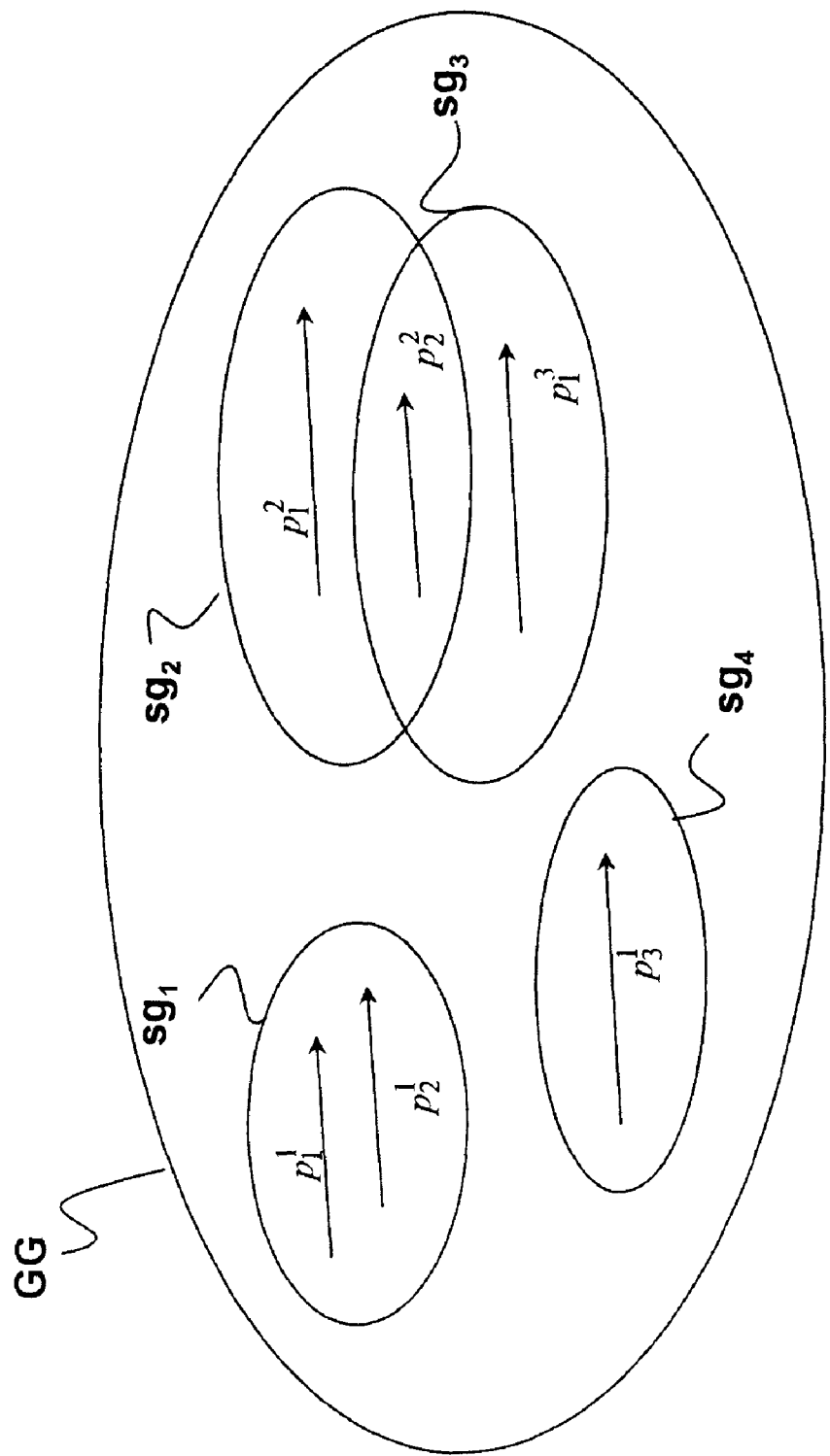
FIG. 9 shows an example of routing of virtual links under a relaxed segregation constraint.

We will assume that the aircraft includes two FMS systems and four FCGU calculators, with each FMS system being at the source of a (multipoint) virtual link intended for the four FCGU calculators, as shown in FIG. 9. The architecture shown is of the "cross-check" type: each FCGU calculator receives flight parameters from the two FMS systems and performs a comparison. If the parameters received by a single calculator differ, the calculator indicates an error and does not perform the processing on the parameter. The safety requirements require that an error on a parameter not remain undetected by more than one calculator. a denotes the parameter, or even a frame of such parameters, transmitted by the FMS systems, assumed to be correct, and a* denotes an incorrect parameter, or even an incorrect frame of parameters, received by a FCGU calculator, in which the error is due to the failure of a switch.

Figure 10B:
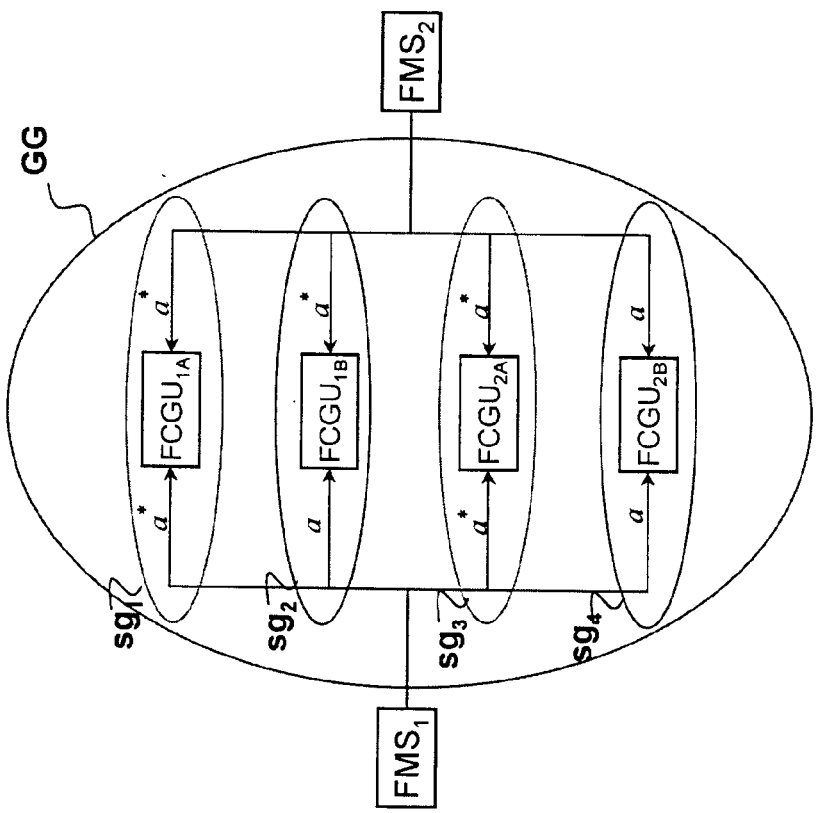
FIGS. 10A and 10B respectively show an acceptable routing configuration and an unacceptable routing configuration.
Figure 10A:
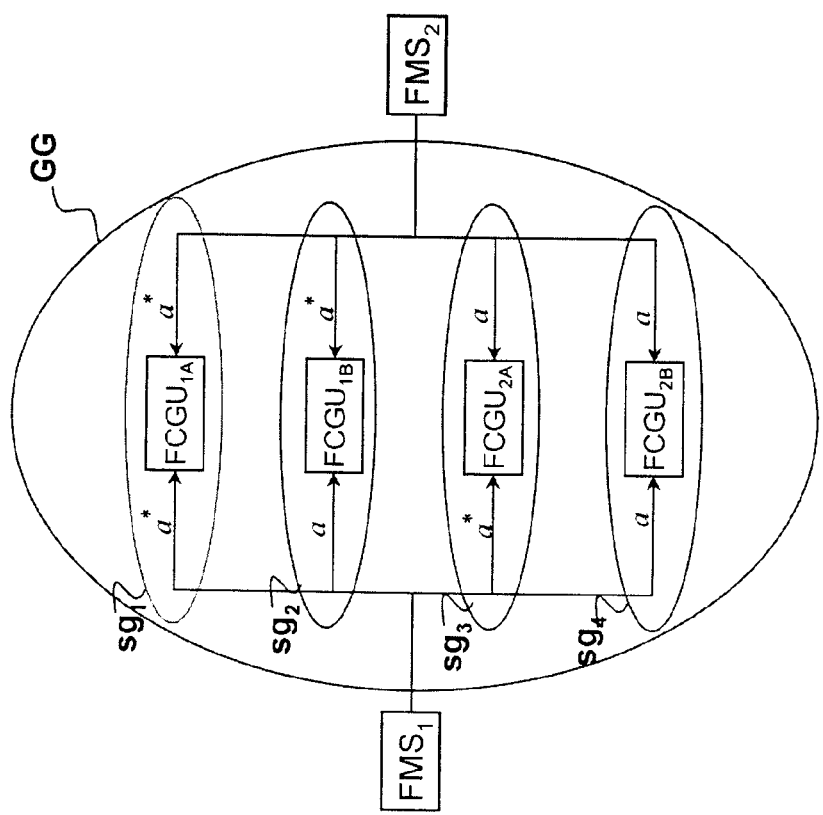

As shown in FIGS. 10A and 10B, a calculator may not detect an error in the case of bilateral corruption (case of $FCGU_{1A}$ in FIG. 10A and $FCGU_{1A}$ and $FCGU_{2A}$ in FIG. 10B), when the two incorrect parameters/incorrect frames are identical. This situation must not occur for more than one calculator. Thus, the situation shown in FIG. 10A (a single undetected error) is acceptable, while that in FIG. 10B (two undetected errors) is not.

The group GG is considered to be made up of paths forming two virtual links to be routed:

$$VL_1 = \{p_1^1, p_1^2, p_1^3, p_1^4\}$$

$$VL_2 = \{p_2^1, p_2^2, p_2^3, p_2^4\}$$

and the group GG is partitioned into as many subgroups as there are FCGU calculators, i.e. $sg_1, sg_2, sg_3, sg_4$, with each subgroup containing the two paths from the FMS systems intended for the calculator considered. It is then required that the failure of a switch invalidates no more than one subgroup ($n_{sg}=1$) among the 4 ($N_{sg}=4$). This relaxed segregation constraint makes it possible to ensure that no more than one FCGU calculator misses diagnosing an error due to a failure of a switch of the network.

The invention claimed is:

1. A process for routing virtual links in a frame-switching network including a plurality of source terminals and a plurality of destination terminals of frames, in which frame switches are connected to one another by physical connections, with each virtual link being defined, for a point-to-point type, by a path through the frame-switching network between a source terminal in the plurality of source terminals and a destination terminal in the plurality of destination terminals, and, for a multipoint type, by a plurality of paths through the frame-switching network between the source terminal and the plurality of destination terminals, the process, for at least one virtual link, comprises:
    (a) selecting, from a set of possible paths between the source terminal and the destination terminal, in case of a virtual link of the point-to-point type, or the plurality of destination terminals, in case of a virtual link of the multipoint type, a subset of paths satisfying at least one predetermined topological constraint belonging to a set of predetermined topological constraints, said set being constituted of absolute topological constraints and relative topological constraints, absolute topological constraints weighing on a routing of a virtual link independently of other virtual links in the frame-switching network, and relative topological constraints concerning virtual links with one another;
    (b) determining, among the subset, a path for the virtual link of the point-to-point type, or a plurality of paths for the virtual link of the multipoint type, and minimizing at least one given cost function; and
    (c) routing the at least one virtual link according to the path or the plurality of paths thus determined.

2. The routing process according to claim 1, wherein, with the at least one virtual link being a point-to-point link and the frame-switching network being partitioned into distinct zones, the at least one predetermined topological constraint is a constraint prohibiting crossing between zones if the frame switches connected respectively to the source terminal and the destination terminal belong to the same zone, and, if not, is a constraint allowing a single crossing between zones belonging respectively to the source and destination terminals.

3. The routing process according to claim 2, wherein the at least one cost function is a number of frame switches traversed by a path.

4. The routing process according to claim 2, wherein the zones are supplied by independent power supply sources.

5. The routing process according to claim 1, wherein the selecting takes into account additional topological constraints of segregation and/or collocation of paths possible with respect to virtual links already routed or to be routed simultaneously with the at least one virtual link or switches of the frame-switching network.

6. The routing process according to claim 1, wherein the selecting takes into account additional topological constraints, in which each additional topological constraint concerns a group of paths forming a set of virtual links to be routed simultaneously, in which the group is made up of a plurality $N_{sg}$ of sub-groups of the paths, and the additional constraints express that, at most, a number $n_{sg}$ of sub-groups such that $0 \leq n_{sg} < N_{sg}$ can be invalidated, with a sub-group being invalidated if all of the paths belonging to it are affected by failure of a same switch of the frame-switching network.

7. The routing process according to claim 1, wherein, with the at least one virtual link being of a multipoint type and the frame-switching network being partitioned into distinct zones, a constraint prohibiting crossing between zones is applied to each possible path between the source terminal and a destination terminal of the at least one virtual link, if the frame switches connected respectively to the source terminal and to the destination terminal belong to the same zone, and, if not, a constraint allowing a single crossing between the zones belonging respectively to the source and destination terminals is applied.

8. The routing process according to claim 7, wherein, for each of the possible paths between the source and destination terminals of the at least one virtual link, additional topological constraints of segregation and/or collocation of the possible paths are applied with respect to virtual links already routed or to be routed simultaneously with the at least one virtual link or frame switches.

9. The routing process according to claim 7, wherein the selecting takes into account additional topological constraints, in which each additional topological constraint concerns a group of paths forming a set of virtual links to be routed simultaneously, in which the group is made up of a plurality $N_{sg}$ of sub-groups of the paths, and the additional topological constraint expresses that, at most, a number $n_{sg}$ of sub-groups such that $0 \leq n_{sg} < N_{sg}$ can be invalidated, with a sub-group being invalidated if all of the paths belonging to it are affected by failure of a same frame switch of the frame-switching network.

10. The routing process according to claim 7 wherein the at least one cost function is a number of switches traversed by a path, and is minimized on each set of possible paths between the source terminal and a destination terminal of the at least one virtual link, to provide at least one candidate path per destination terminal.

11. The routing process according to claim 10, wherein combinations of K candidate paths are produced, in which K is a number of destination terminals of the at least one virtual link, and each combination corresponds to a possible routing solution of the at least one virtual link, and a second cost function is minimized on the set of the possible solutions thus obtained.

12. The routing process according to claim 11, wherein the second cost function evaluates, for each possible solution, the number of switches shared between its various constituent paths.

13. The routing process according to claim 1, wherein, for at least one bundle of links involved in performing the same function, each virtual link of the at least one bundle being point-to-point and the frame-switching network being partitioned into distinct zones, a constraint prohibiting crossing between zones is applied, for each of the virtual links of the at least one bundle, to each possible path between the source terminal and the destination terminal of the at least one virtual link, if the frame switches connected respectively to the source terminal and to the destination terminal belong to the same zone, and, if not, a constraint allowing a single crossing between the zones belonging respectively to the source and destination terminals is applied.

14. The routing process according to claim 13, wherein, for each virtual link of the at least one bundle and for each of the possible paths between the source terminal and the destination terminal of the at least one virtual link, additional topological constraints of segregation and/or collocation of the possible paths are applied with respect to virtual links already routed or to be routed simultaneously with the at least one virtual link or frame switches.

15. The routing process according to claim 13, wherein the selecting takes into account additional topological constraints, in which each additional topological constraint concerns a group of paths forming a set of virtual links to be routed simultaneously, in which the group is made up of a plurality $N_{sg}$ of sub-groups of the paths, and the additional constraints express that, at most, a number $n_{sg}$ of sub-groups such that $0 \leq n_{sg} < N_{sg}$ can be invalidated, with a sub-group being invalidated if all of the paths belonging to it are affected by failure of a same switch of the frame-switching network.

16. The routing process according to claim 13, wherein the at least one cost function is a number of switches traversed by a path and is minimized, for each of the links of the at least one bundle, on each set of possible paths between the source terminal and the destination terminal of the at least one virtual link, to provide at least one candidate path per link.

17. The routing process according to claim 16, wherein combinations of N candidate paths, where N is a number of links of the at least one bundle are produced, with each combination corresponding to a possible routing solution of the at least one bundle, and a third cost function is minimized on the set of the possible solutions thus obtained.

18. The routing process according to claim 17, wherein the third cost function evaluates, for each possible routing solution of the at least one bundle, the number of switches shared between the paths of which the solution is the combination.

19. The routing process according to claim 1, wherein, for at least one bundle of links involved in performing the same function, with each link of the at least one bundle being of a multipoint type and the frame-switching network being partitioned into distinct zones, a constraint prohibiting crossing between zones is applied, for each of the links of the at least one bundle, to each possible path between the source terminal and the destination terminal of the at least one virtual link, if the frame switches connected respectively to the source terminal and to the destination terminal belong to the same zone, and, if not, a constraint allowing a single crossing between the zones belonging respectively to the source and destination terminals is applied.

20. The routing process according to claim 19, wherein, for each virtual link and for each of the possible paths between the source terminal and the destination terminal of the at least one virtual link, additional topological constraints of segregation and/or collocation of the possible paths are applied with respect to virtual links already routed or to be routed simultaneously with the at least one virtual link or frame switches of the frame-switching network.

21. The routing process according to claim 19, wherein the selecting takes into account additional topological constraints, in which each additional topological constraint concerns a group of paths forming a set of virtual links to be routed simultaneously, in which the group is made up of a plurality $N_{sg}$ of sub-groups of said paths, and the additional constraints express that, at most, a number $n_{sg}$ of sub-groups such that $0 \leq n_{sg} < N_{sg}$ can be invalidated, with a sub-group being invalidated if all of the paths belonging to it are affected by failure of a same switch of the frame-switching network.

22. The routing process according to claim 19, wherein the at least one cost function is a number of switches traversed by a path and will be minimized, for each of the links of the bundle, on each set of possible paths between the source terminal and the destination terminal of the at least one virtual link, to provide at least one candidate path per link and per destination terminal.

23. The routing process according to claim 22, wherein combinations of $K_1 + K_2 + \ldots + K_N$ candidate paths where $K_i$, $1 < i \leq N$ are the numbers of respective paths of the N links of the at least one bundle are produced, with each combination corresponding to a possible routing solution of the bundle, and a fourth cost function is minimized on the set of the possible solutions thus obtained.

24. The routing process according to claim 23, wherein the fourth cost function evaluates, for each possible routing solution of the bundle, the number of switches traversed by the links of the at least one bundle corresponding to this solution.

25. The routing process according to claim 1, wherein a fifth cost function evaluating a traffic load of the most heavily loaded switch of the frame-switching network is minimized, on a set of routing solutions obtained by minimizing one of second, third, or fourth cost functions.

26. A non-transitory computer readable medium storing software computer executable instructions, wherein the instructions, when executed by a computer, cause the computer to perform a process for routing virtual links in a frame-switching network including a plurality of source terminals and a plurality of destination terminals of frames, in which frame switches are connected to one another by physical connections, with each virtual link being defined, for a point-to-point type, by a path through the frame-switching network between a source terminal in the plurality of source terminals and a destination terminal in the plurality of destination terminals, and, for a multipoint type, by a plurality of paths through the frame-switching network between the source terminal and the plurality of destination terminals, the process, for at least one virtual link, comprises:

(a) selecting, from a set of possible paths between the source terminal and the destination terminal, in case of a virtual link of the point-to-point type, or the plurality of destination terminals, in case of a virtual link of the multipoint type, a subset of paths satisfying at least one predetermined topological constraint belonging to a set of predetermined topological constraints, said set being constituted of absolute topological constraints and relative topological constraints, absolute topological constraints weighing on a routing of a virtual link independently of other virtual links in the frame-switching network, and relative topological constraints concerning virtual links with one another;

(b) determining, among the subset, a path for the virtual link of the point-to-point type, or a plurality of paths for the virtual link of the multipoint type, and minimizing at least one given cost function; and (c) routing the at least one virtual link according to the path or the plurality of paths thus determined.

\* \* \* \* \*